(12) United States Patent
Desnoyers et al.

(10) Patent No.: US 6,791,948 B1
(45) Date of Patent: Sep. 14, 2004

(54) DISTRIBUTED SWITCH AND CONNECTION CONTROL ARRANGEMENT AND METHOD FOR DIGITAL COMMUNICATIONS NETWORK

(75) Inventors: Peter J. Desnoyers, Cambridge, MA (US); Shawn A. Clayton, Boylston, MA (US); Nitin D. Godiwala, Boylston, MA (US)

(73) Assignee: Emulex Corporation, Costa Mesa, CA (US)

( * ) Notice: Subject to any disclaimer, the term of this patent is extended or adjusted under 35 U.S.C. 154(b) by 0 days.

(21) Appl. No.: 09/347,709

(22) Filed: Dec. 27, 1999

Related U.S. Application Data

(63) Continuation-in-part of application No. 09/071,855, filed on May 2, 1998, now abandoned.

(51) Int. Cl.[7] .............................................. H04L 12/56
(52) U.S. Cl. ........................................ 370/254; 370/351
(58) Field of Search ............................... 370/254, 255, 370/256, 257, 408, 395.1, 238, 389, 351

(56) References Cited

U.S. PATENT DOCUMENTS

| | | | | |
|---|---|---|---|---|
| 5,185,860 A | * | 2/1993 | Wu ............................ | 709/224 |
| 5,297,138 A | | 3/1994 | Black | |
| 5,400,333 A | | 3/1995 | Perlman | |
| 5,467,345 A | | 11/1995 | Cutler et al. | |
| 5,710,885 A | * | 1/1998 | Bondi ......................... | 709/224 |
| 5,732,086 A | | 3/1998 | Liang et al. | |
| 5,734,824 A | | 3/1998 | Choi | |
| 5,737,319 A | * | 4/1998 | Croslin et al. ............... | 370/255 |
| 5,740,346 A | * | 4/1998 | Wicki et al. ................. | 714/224 |
| 5,835,720 A | * | 11/1998 | Nelson et al. ............... | 709/224 |
| 5,850,397 A | | 12/1998 | Raab et al. | |
| 5,884,036 A | * | 3/1999 | Haley ......................... | 709/224 |
| 6,011,804 A | * | 1/2000 | Bertin et al. ................ | 370/468 |
| 6,031,817 A | * | 2/2000 | Moy ........................... | 370/468 |
| 6,069,895 A | * | 5/2000 | Ayandeh ..................... | 370/399 |
| 6,094,683 A | * | 7/2000 | Drottar et al. .............. | 709/226 |
| 6,151,319 A | * | 11/2000 | Dommety et al. .......... | 370/395 |
| 6,530,032 B1 | * | 3/2003 | Shew et al. ................. | 714/4 |

FOREIGN PATENT DOCUMENTS

EP          0676878 A1       10/1995

\* cited by examiner

Primary Examiner—Kenneth Vanderpuye
(74) Attorney, Agent, or Firm—Morrison & Foerster LLP

(57) ABSTRACT

A network includes devices such as computers and the like, interconnected by switching nodes. The devices are identified by globally-unique identifiers, such as Ethernet MAC addresses or the like. At least some of the devices are configured to determine the topology of the network. In determining the network topology, a device operates in a series of iterations, in each iteration transmitting a request message over a path to determine whether an additional entity is present in the network. If an additional entity is present at the end of the path defined in the request message, the entity will generate a response, which is provided to the device. The device, on receiving the response, will add information concerning the entity to a network topology database, which it maintains to define the topology of the database. At least some of the devices, as they discover additional switching nodes in the network, will attempt to configure the switching nodes. In that operation, the devices interact with the switching nodes in connection with a locking protocol to ensure that only one device attempts to configure each switching node. Each device, after it determines the network topology, and when it needs to transfer information with another device, can determine an appropriate route using the network topology information in its network topology database. After determining the appropriate route, the devices will load routing information into the switching nodes to enable them to forward messages containing the information to be transferred thereamong. Each device will provide to the other devices its globally-unique address, which the other devices use to identify the respective device.

8 Claims, 9 Drawing Sheets

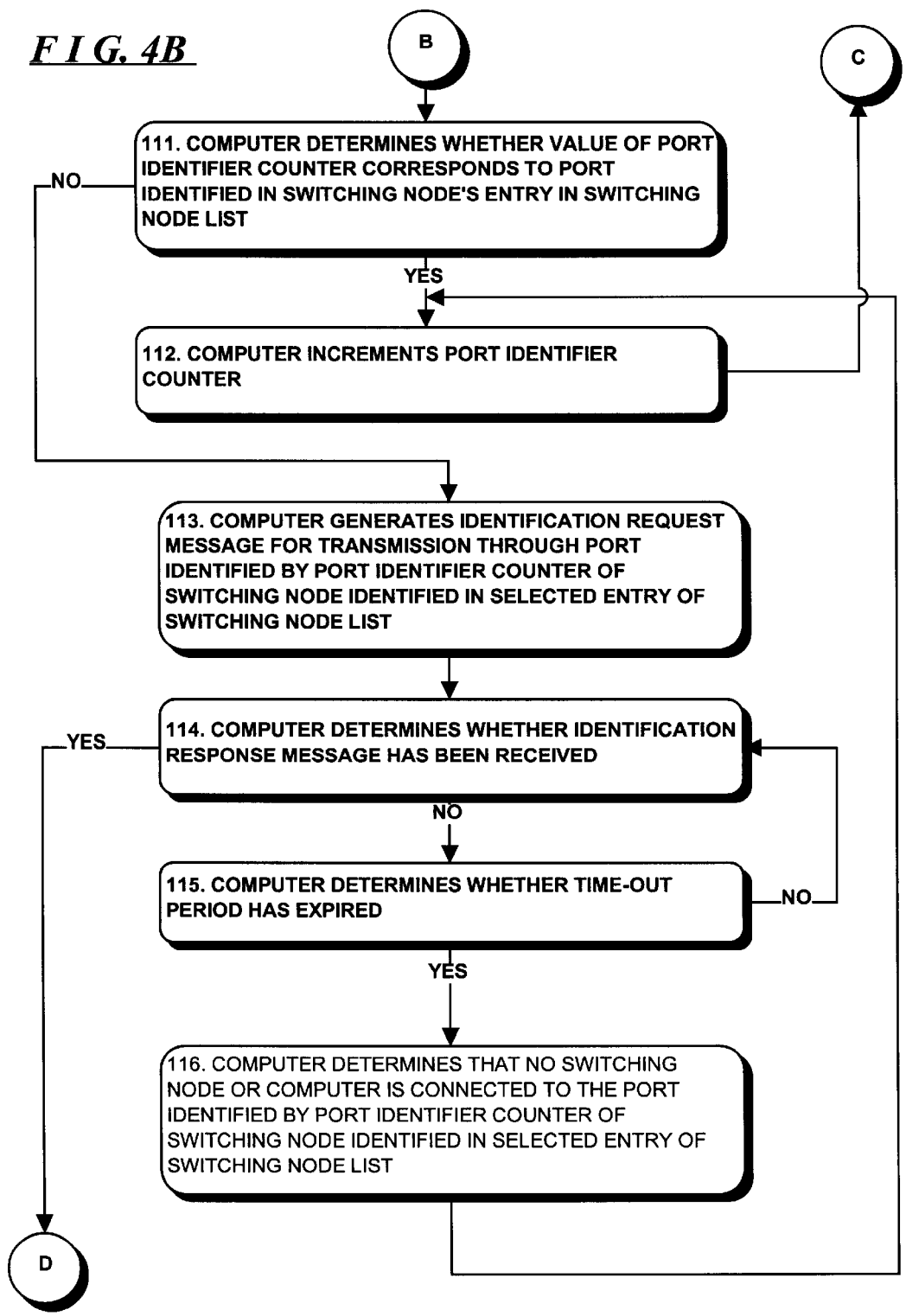

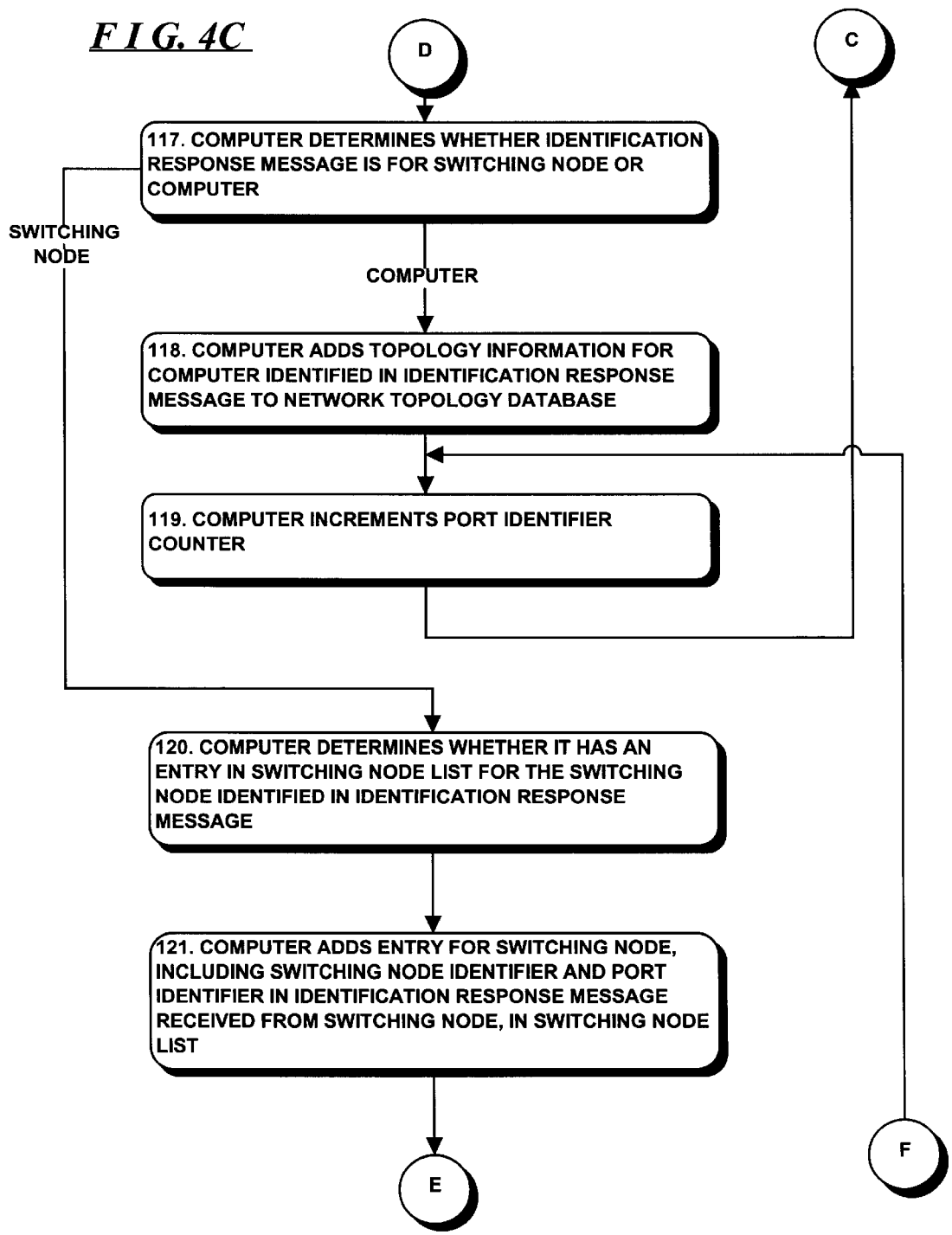

DISTRIBUTED SWITCH AND CONNECTION CONTROL ARRANGEMENT AND METHOD FOR DIGITAL COMMUNICATIONS NETWORK

This application is a continuation in part of U. S. patent application Ser. No. 09/071,855 filed May 2, 1998 now abandoned in the name of Peter J. Desnoyers, et al., and entitled Distributed Switch And Connection Control Arrangement And Method For Digital Communications Network, assigned to the assignee of the instant application, incorporated by reference.

U. S. patent application Ser. No. 09/065,118, filed Apr. 23, 1998, in the name of Maria C. Gutierrez, et al., and entitled "System And Method For Regulating Message Flow In A Digital Data Network" (hereinafter referred to as the "Gutierrez, et al., patent application"), assigned to the assignee of the instant application, incorporated by reference.

U. S. patent application Ser. No. 09/065,115, filed Apr. 23, 1998, in the name of Shawn A. Clayton, et al., and entitled "System And Method For Scheduling Message Transmission And Processing In A Digital Data Network" (hereinafter referred to as the "Clayton, et al., patent application"), assigned to the assignee of the instant application, incorporated by reference.

U. S. patent application Ser. No. 09/067,533, filed Apr. 27, 1998, in the name of James B. Williams, and entitled "System And Method For Transferring Information Representative Of Conditions At A Receiving Device For A Virtual Circuit In A Computer Network" (hereinafter referred to as the "Williams patent application"), assigned to the assignee of the instant application, incorporated by reference.

FIELD OF THE INVENTION

The invention relates generally to the field of digital communications systems and more particularly to digital networks for facilitating communication of digital data in, for example, digital image, audio and video distribution systems and among digital computer systems. The invention more specifically provides a distributed switch and connection control arrangement and method for a digital communications network.

BACKGROUND OF THE INVENTION

Digital networks have been developed to facilitate the transfer of information, including data and programs, among digital computer systems and other digital devices. A variety of types of networks have been developed and implemented using diverse information transfer methodologies. In some networks, such as the well-known Ethernet, a single wire is used to interconnect all of the devices connected to the network. While this simplifies wiring of the network in a facility and connection of the devices to the network, it results in generally slow information transfer, since the wire can only carry information, in the form of messages, from a single device at a time. To alleviate this to some extent, in some Ethernet installations, the network is divided into a number of sub-networks, each having a separate wire, with interfaces interconnecting the wires. In such installations, wires can carry messages for devices connected thereto simultaneously, which increases the number of messages that can be transferred simultaneously. It is only when a device connected to one wire needs to send a message to a device connected to another wire that wires in two or more sub-networks will be used, making them unavailable for use by other devices connected thereto.

To further alleviate this, networks have been developed in which communications are handled through a mesh of switching nodes. The computer systems and other devices are connected to various switching nodes. Since the switching nodes themselves are interconnected in a variety of patterns, a number of paths may be available between pairs of the devices, so that if one path is congested, another may be used. Such an arrangement may result in a network which is more complicated than an Ethernet network, but it can provide substantially higher information transfer rates, particularly if optical fiber is used as the media interconnecting the switching nodes and devices. One problem arises in connection with such networks (that is, networks in which communications are handled through a mesh of switching nodes) is, when one device is to transfer information to another device, to identify a path, and preferably and optimal path, through the switching nodes comprising the network, over which information can be transferred. Typically in networks, the switching nodes include facilities for determining the topology of the switching node mesh comprising the network, and they (that is, the switching nodes) can determine optimal paths using path determination algorithms such as the well-known "open shortest-path first" ("OSPF") algorithm. Generally, in such networks, each switching node establishes a network topology database (also known as a "link-state database") in which it stores information defining the network topology. If the network is assumed to be failure-free and static, each switching node's network topology could be established a priori by a network administrator. However, generally it is desirable to provide that the topology of the network may be dynamic, and for such a network, each switching node periodically generates link state advertising messages identifying it and its connections to other switching nodes or devices, which it floods throughout the network. As each switching node receives a link state advertising message, the receiving switching node will update its network topology database with the information from the link state advertising message.

There are several problems that arise in connection with such networks. First, the link state advertising messages take up network bandwidth, reducing the amount of bandwidth that otherwise could be used for transmitting information messages between devices. In addition, and more generally, requiring the switching nodes to determine paths through the network, and maintain the network topology databases required to allow them to determine such paths, can require the switching nodes to be provided with a significant amount of processing power and information storage capability, which can significantly increase the cost of the switching nodes.

SUMMARY OF THE INVENTION

The invention provides a new and improved distributed switch and connection control arrangement and method for a digital communications network.

In brief summary, the invention A network includes devices such as computers and the like, interconnected by switching nodes. The devices are identified by globally-unique identifiers, such as Ethernet MAC addresses or the like. At least some of the devices are configured to determine the topology of the network. In determining the network topology, a device operates in a series of iterations, in each iteration transmitting a request message over a path to determine whether an additional entity is present in the network. If an additional entity is present at the end of the path defined in the request message, the entity will generate a response, which is provided to the device. The device, on receiving the response, will add information concerning the entity to a network topology database, which it maintains to define the topology of the database. At least some of the devices, as they discover additional switching nodes in the network, will attempt to configure the switching nodes. In that operation, the devices interact with the switching nodes in connection with a locking protocol to ensure that only one device attempts to configure each switching node. Each device, after it determines the network topology, and when it needs to transfer information with another device, can determine an appropriate route using the network topology information in its network topology database. After determining the appropriate route, the devices will load routing information into the switching nodes to enable them to forward messages containing the information to be transferred thereamong. Each device will provide to the other devices its globally-unique address, which the other devices use to identify the respective device.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
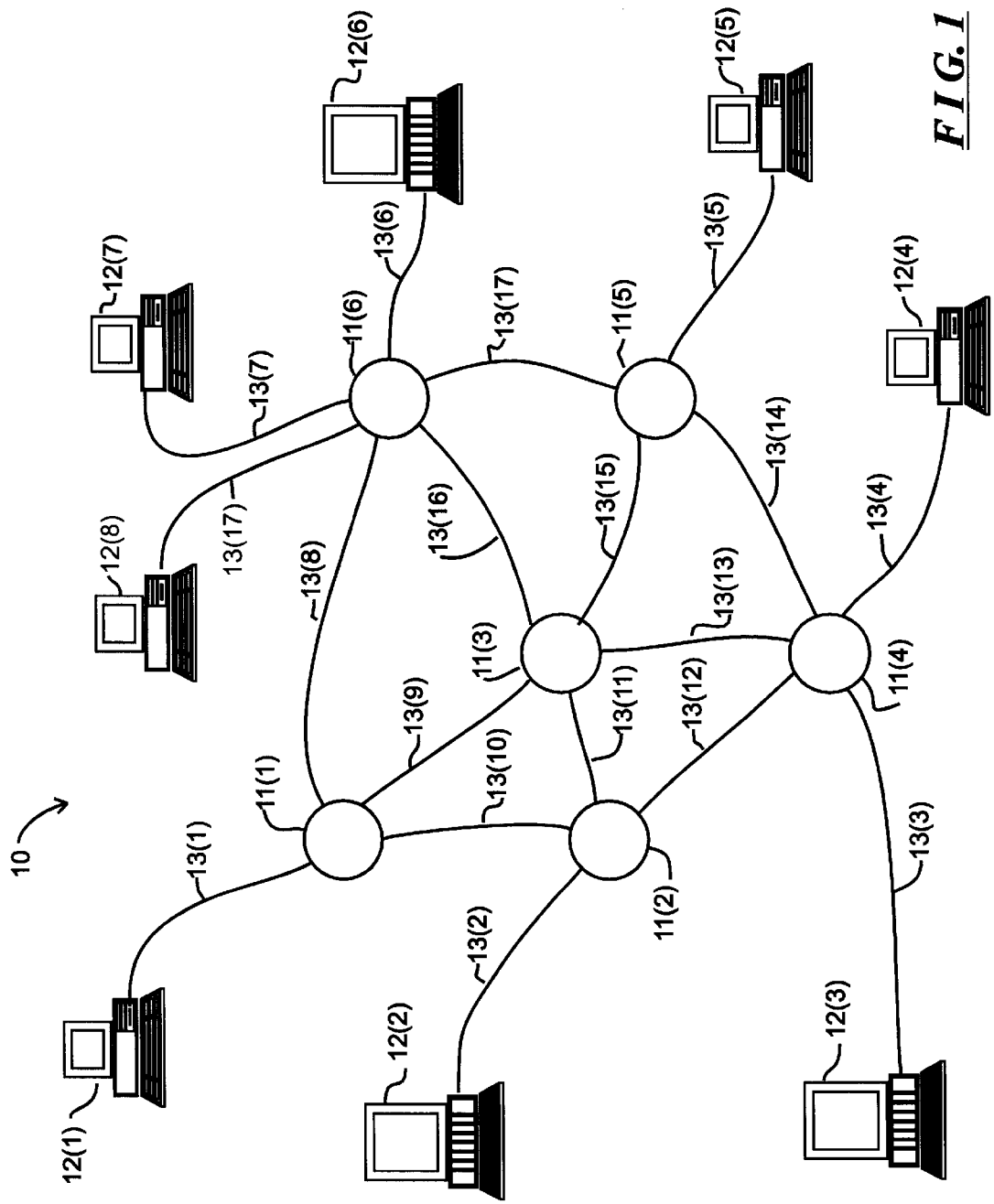
FIG. 1 schematically depicts a computer network providing a new and improved distributed switch and connection control arrangement in connection with the invention.

FIG. 1 schematically depicts a computer network 10 including a plurality of switching nodes 11(1) through 11(N) (generally identified by reference numeral 11($n$)) for transferring signals representing data among a number of devices, which in FIG. 1 are represented by computers 12(1) through 12(M) (generally identified by reference numeral 12($m$)). The computers 12($m$), as is conventional, process data, in accordance with their program instructions to generate processed data. In their processing, a computer 12($m_s$) (subscript "S" referencing "source") may, as a source computer, need to transfer data, processed data and/or program instructions (all of which will be referred to herein generally as "information") to another, destination, computer 12($m_D$) (subscript "D" referencing "destination"), which may need to use the transferred information in its operations. Each computer 12($m$) is connected over a communication link, generally identified by reference numeral 13($p$), to a switching node 11($n$) to facilitate transmission of data thereto or the reception of data therefrom. The switching nodes 11($n$) receive, buffer and forward data received from the computers 11($n$) and from other switching nodes 11($n$) to facilitate the transfer of data among the computers 12($m$). The switching nodes 11($n$) are interconnected by communication links, also generally identified by reference numeral 13($p$) to facilitate the transfer of data thereamong. The communication links 13($p$) may utilize any convenient data transmission medium. Each communication link 13($p$) depicted in FIG. 1 is preferably bi-directional, allowing the switching nodes 11($n$) to transmit and receive signals among each other and with computers 12($m$) connected thereto over the same link; to accommodate bi-directional communication links, separate media may be provided for each communication link 13($p$), each of which facilitates unidirectional transfer of signals thereover.

In one embodiment, the data is transferred using the well-known "ATM" ("Asynchronous Transfer Mode") transfer methodology. That methodology is described in detail in C. Partridge, *Gigabit Networking*, (Reading M A: Addison Wesley Publishing Company, 1994), primarily in chapters 3 and 4, and D. McDysan, et al., *ATM Theory And Application* (McGraw Hill, 1995) and will not be described in detail. Generally, in the ATM methodology, the computers 12($m$) and the switching nodes 11($n$) transmit data in the form of fixed-length "cells" over "virtual circuits" established between computers 12($m$) through the network. Each virtual circuit essentially defines a path from a source computer 12($m_S$) to a destination computer 12 ($m_D$) through one or more switching nodes 11($n$) and over respective communication links 13($p$). In the ATM data transfer methodology, for a block of information to be transferred from a source computer 12($m_S$) to a destination computer 12($m_D$) over a virtual circuit established therebetween, the source computer 12($m_S$) allocates the data block to one or a series of "cells" for transmission serially over the communication link 13($p$). Each cell transferred through the network 10 includes a header portion and a data portion, with the header portion including virtual circuit identifier information for controlling the transfer of the cell through the network 10, along with protocol and other control information, including an "end of message" ("EOM") flag. The data portion contains data from the data block that is to be transferred in the cell. The data portion of each cell is of fixed, predetermined length, which, in one embodiment, is forty-eight bytes. The source computer 12($m_S$) will pad the data in the data portion of the cell (if one cell will accommodate the data block to be transferred) or the last cell in the series (if multiple cells are required to accommodate the data block to be transferred) if the amount of data in the block is not an integral multiple of the size of the data portion of each cell to ensure that the data portion of the last cell has the required length. If a series of cells are required to transfer a data block, the source computer 12($m_S$) will transmit the cells so that the data in the data portions of the series of cells to conform to the order of data in the data block that is being transferred. In addition, if that cells are properly transferred to the destination computer 12($m_D$), the destination computer will receive the cells in the same order. In the last cell in a series which contains information from a data block, the end of message flag in the header portion is set, thereby to notify the destination computer 12($m_D$) that it has received all of the cells containing data for the data block.

The invention provides an arrangement for enabling the computers 12($m$), instead of the switching nodes 11($n$), to efficiently determine the topology of the network 10 and use the topology to facilitate the establishment of virtual circuits through the switching nodes for use in connection with transfer of messages through the network. Generally, operations in accordance with the invention proceed in two general phases. In a first phase, which may generally be described as a network topology discovery and switching node configuration phase, each of the computers 12($m$) independently of the other computers, performs a network topology discovery operation to identify the topology of the network, that is, the group of switching nodes comprising the network, the pattern of communication links 13($p$)

interconnecting the switching nodes $11(n)$, and the pattern of communication links interconnecting the switching nodes and respective ones of the computers $12(m)$. As each computer $12(m)$ determines the topology of the network, it establishes and updates a network topology database 33, which it will use during the second phase. In addition, during the first phase, one or more of the computers $12(m)$ will perform predetermined configuration operations to configure the switching nodes $11(n)$.

Each respective computer $12(m)$ determines the network topology in a recursive manner in a plurality of iterations. In a first iteration, computer $12(m_1)$ (which comprises one of computers $12(m)$) transmits an identification request message over the communication link $13(p_1)$ connected thereto. If the computer $12(m_1)$ does not receive a response to the identification request message, it is not connected to a network, or there is no operable device, either a switching node $11(n)$ or a computer $12(m')$, connected thereto. On the other hand, if there is a response to the identification request message, the response will include the identification of the responding device. If the responding device is a switching node $11(n_1)$, the response will also identify one of a plurality of ports (as will be described below) connected to the communication link over which the identification request message was received, which, in turn corresponds to the port over which the response was transmitted. The computer $12(m_1)$ will add this information to its network topology database 33.

Thereafter, the computer $12(m_1)$ will initiate a second iteration in which it determines the identifications of the switching node(s) and/or computers which are connected to the switching node which received the identification request message in the first iteration. In that iteration, the computer $12(m_1)$ will, in a plurality of sub-iterations, generate identification request messages, which it transmits to the switching node $11(n_1)$. In each sub-iteration, the identification request message identifies the switching node $11(n_1)$ and one of the other ports (that is, one of the ports that is not connected to the communication link $13(p_1)$ connected to computer $12(m_1)$). When the switching node $11(n_1)$ receives the identification request message, it will transmit the message through the identified port. If a device responds to the identification request message, as in the first iteration, the response will include the identification of the responding device and, if the responding device is a switching node $11(n_2)$, the port of the switching node $11(n_2)$ through which the identification request message was received. The switching node $11(n)$ will, in turn, forward any responses that it receives to the computer $12(m_1)$. From each response, the computer $12(m_1)$ can determine the identification of the responding device, the port of the switching node $11(n_1)$ over which the identification request message was transmitted and, if the responding device is a switching node $11(n_2)$, the identification of the port of the switching node $11(n_2)$ over which the identification request message was received by the switching node $11(n_2)$, all of which the computer $12(m_1)$ will add to its network topology database 33. If the computer $12(m_1)$ does not receive a response to the identification request message directed to a particular port of the switching node $11(n_1)$, it (that is, the computer $12(m_1)$) need not add such information to the network topology database 33. The computer $12(m_1)$ can continue these operations through a series of iterations, sub-iterations, sub-sub-iterations, etc., each identification request message including the sequence to switching nodes $11(n_1)$, $11(n_2)$, . . . , and respective ports to be used in transmitting the respective identification request message, until it does not receive any responses to identification request messages transmitted thereby.

Each of the computers $12(m)$ can perform the operations as described above to acquire network topology information. Generally, if all of the computers $12(m)$ and switching nodes $11(n)$ are powered up and operative at the time that the operations are performed, each of the computers $12(m)$ can acquire network topology information for the entire network by performing the operations described above. However, if one or more computers $12(m)$, for example, are not powered up when others of the computers $12(m')$ are performing the network topology discovery and switching node configuration phase, the computers $12(m)$ may not respond to identification request messages generated by the computers $12(m')$, in which case the computers $12(m)$ will not be identified in the network topology database $33s$ of computers $12(m')$. It will be appreciated, however, that, when the computers $12(m)$ later become operational, they will be performing respective network topology discovery and switching node configuration phases, and in that process they will eventually generate identification request messages which will be transferred to the computers $12(m')$. Thus, when the computers $12(m')$ receive the identification request messages from computers $12(m)$ which are not identified in their network topology database 33, they (that is, computers $12(m')$) can repeat the operations described above in connection with at least some portion of the network to which the computers $12(m)$ are connected, thereby to obtain the network topology information therefor for its network topology database 33.

A specific example will help provide an understanding the operations performed by the computers $12(m)$ and switching nodes $11(n)$ during the network topology discovery operations. In this example, it will be assumed that each switching node $11(n)$ has a maximum of P ports, although it will be appreciated that not all ports need to be connected to either a computer $12(m)$ or to another switching node $11(n')$. This example will describe operations performed by computer 12(1) in connection with the network topology discovery operations. Thus, during the first iteration, the computer 12(1) will generate an identification request message and transmit the message over the communication link 13(1) connected thereto. If the switching node 11(1) is powered-up, it will receive the identification request message, and generate an identification response message that identifies itself and the port over which the identification request message was received. If the identification of switching node 11(1) is, for example SN1, and the port over which the switching node 11(1) received the identification request message is, for example P1, the identification response message provided by switching node 11(1) will contain topology information <P1,SN1>, thereby to indicate that the identification request message was received through port P1 by the switching node with identification SN1. After generating the identification response message, the switching node 11(1) will transmit it through the same port P1, thereby to provide it to computer 12(1). The computer 12(1), in turn, will obtain the topology information <P1,SN1> from the identification response message and store it in its network topology database 33; it will be appreciated that the topology information indicates that the computer $12(m)$ is connected to a switching node with identification SN1 over port P1.

Thereafter, in a second iteration, the computer 12(1) will attempt to obtain the identification of the devices (that is, the switching nodes $11(n)$ and/or computers $12(m)$) which are connected to the other ports P2, . . . , PP of switching node 11(1). In that iteration, the computer 12(1) will initially generate an identification request message with information <P1,SN1,P2>, and transmit the message over the communication link 13(1) connected thereto. The switching node 11(1) will receive the identification request message and, since the message contains its identification SN1, it will forward the message through the port P2. If port P3 is connected to communication link 13(8), the identification request message will be transmitted to switching node 11(6). If the switching node 11(6) is powered up, it will receive the identification request message and generate an identification response message that identifies itself and the port over which the identification request message was received. If the identification of switching node 11(6) is, for example, SN6, and the port over which the switching node 11(6) received the identification request message is, for example, P3, the identification response message provided by switching node 11(6) will contain information <P1,SN1,P2|P3,SN6>, essentially appending its topology information P3,SN6 to the topology information P1,SN1,P2, contained in the identification request message received from the switching node 11(1). After generating the identification response message, the switching node 11(6) will forward the message through the port P3 over which the identification request message was received, thereby to forward it to the switching node 11(1). The switching node 11(1), upon receiving the identification response message, will forward it through the port P1, thereby to forward it to the computer 12(1). The computer 12(1), upon receiving the identification response message, will obtain the network topology information P1,SN1,P2|P3,SN6 from the identification response information and store it in its network topology database 33. It will be appreciated that this network topology information indicates that the switching node with identification SN1 that is connected to the computer 11(1) is, in turn, connected through port P2 to the switching node with identification SN6, and that the switching node with identification SN6 is connected through port P3 to the switching node with identification SN1.

Thereafter, and further in the second iteration, the computer 12(1) will generate an identification request message with information <P1,SN1,P3>, and transmit the message over the communication link 13(1) connected thereto. The switching node 11(1) will receive the identification request message and, since the message contains its identification SN1, it will forward the message through the port P3. If port P3 is connected to communication link 13(9), the identification request message will be transmitted to switching node 11(3). If the switching node 11(3) is powered up, it will receive the identification request message and generate an identification response message that identifies itself and the port over which the identification request message was received. If the identification of switching node 11(3) is, for example, SN3, and the port over which the switching node 11(3) received the identification request message is, for example, P8, the identification response message provided by switching node 11(3) will contain information <P1,SN1,P3|P8,SN3>, essentially appending its topology information P8,SN3 to the topology information P1,SN1,P3, contained in the identification request message received from the switching node 11(1). After generating the identification response message, the switching node 11(3) will forward the message through the port P8 over which the identification request message was received, thereby to forward it to the switching node 11(1). The switching node 11(1), upon receiving the identification response message, will forward it through the port P1, thereby to forward it to the computer 12(1). The computer 12(1), upon receiving the identification response message, will obtain the network topology information P1,SN1,P3|P8,SN3 from the identification response information and store it in its network topology database 33. It will be appreciated that this network topology information indicates that the switching node with identification SN1 that is connected to the computer 11(1) is, in turn, connected through port P3 to the switching node with identification SN3, and that the switching node with identification SN3 is connected through port P8 to the switching node with identification SN1.

Thereafter, and further in the second iteration, the computer 12(1) will generate an identification request message with information <P1,SN1,P4>, and transmit the message over the communication link 13(1) connected thereto. The switching node 11(1) will receive the identification request message and, since the message contains its identification SN1, it will forward the message through the port P4. If port P4 is connected to communication link 13(10), the identification request message will be transmitted to switching node 11(2). If the switching node 11(2) is powered up, it will receive the identification request message and generate an identification response message that identifies itself and the port over which the identification request message was received. If the identification of switching node 11(2) is, for example, SN2, and the port over which the switching node 11(2) received the identification request message is, for example, P6, the identification response message provided by switching node 11(2) will contain information <P1,SN1,P4|P6,SN2>, essentially appending its topology information P6,SN2 to the topology information P1,SN1,P4, contained in the identification request message received from the switching node 11(1). After generating the identification response message, the switching node 11(2) will forward the message through the port P6 over which the identification request message was received, thereby to forward it to the switching node 11(1). The switching node 11(1), upon receiving the identification response message, will forward it through the port P1, thereby to forward it to the computer 12(1). The computer 12(1), upon receiving the identification response message, will obtain the network topology information P1,SN1,P4|P6,SN2 from the identification response information and store it in its network topology database 33. It will be appreciated that this network topology information indicates that the switching node with identification SN1 that is connected to the computer 11(1) is, in turn connected through port P4 to the switching node with identification SN2, and that the switching node with identification SN2 is connected through port P6 to the switching node with identification SN1.

Thereafter, and further in the second iteration, the computer 12(1) will continue to generate identification request messages with respective information items <P1,SN1,P5>, . . . <P1,SN1,PP> and transmit the message over the communication link 13(1) connected thereto. The switching node 11(1), after receiving those identification request messages, will attempt to transmit them through respective ports P5, . . . PP. However, since those ports are not connected to either computers 12(m) or to switching nodes 11(n), the computer 12(1) will not receive response messages thereto. For each such identification request message, after a respective timeout period following transmission, the computer 12(1) can determine that the respective port P5, . . . ,PP is not connected, and provide such information in its network topology database 33.

After operations in connection with the identification request message for the last port PP of the switching node 12(1), the computer 12(1) will begin the third iteration. Initially in the third iteration, the computer 12(1) will attempt to obtain the identification of the devices (that is, the switching nodes 11(n) and/or computers 12(m)) which are connected to the other ports P1,P2,P4 . . . ,PP of switching node 11(6), which, as noted above, is connected through port P3 to switching node 11(1). It will be appreciated that operations need not be performed in connection with port P3 of switching node 11(6), since the computer 12(1) determined in the second iteration that that port is connected to switching node 11(1). In the third iteration, the computer 12(1) will initially generate an identification request message with information <P1,SN1,P2|P3,SN6,P1>, and transmit the message over the communication link 13(1) connected thereto. The switching node 11(1) will receive the identification request message and, since the message contains its identification SN1, it will forward the message through its port P2 to switching node 11(6). The switching node 11(6), in turn, will receive the identification request message and, since the message further contains its identification SN6, it will forward the message through its port P1. If the port P1 of switching node 11(6) is connected to, for example, communication link 13(16), switching node 11(6) to transmit the message to the switching node 11(3). If the switching node 11(3) is powered up, it will receive the identification request message and generate an identification response message that identifies itself and the port over which the identification request message was received. If the identification of switching node 11(3) is, for example, SN3, and the port over which the switching node 11(3) received the identification request message is, for example, P5, the identification response message provided by switching node 11(3) will contain information <P1,SN1,P2|P3,SN6|P5, SN3>, essentially appending its topology information P5,SN3 to the topology information P1,SN1,P2|P3,SN6 contained in the identification request message received from the switching node 11(6). After generating the identification response message, the switching node 11(3) will forward the message through the port P5 over which the identification request message was received, thereby to forward it to the switching node 11(6). The switching node 11(6), upon receiving the identification response message, will forward it through its port P3, thereby to forward it to switching node 11(1), and the switching node 11(1), in turn, will forward the message through its port P1, thereby to forward it to the computer 12(1). The computer 12(1), upon receiving the identification response message, will obtain the network topology information P1,SN1,P2|P3,SN6, P1|P5,SN3 from the identification response information and store it in its network topology database 33. It will be appreciated that this network topology information indicates that the switching node with identification SN6 is, in turn, connected through its port P1 to the switching node with identification SN1, and that the switching node with identification SN3 is connected through port P53 to the switching node with identification SN5.

It will be appreciated that the corresponding operations will be performed for each of the other ports P2,P4, . . . PP of switching node 11(6), and the respective ports of switching nodes 11(3) and 11(2) which were discovered in the second iteration. Thus, by the end of the third iteration, the computer 12(1) will have discovered (i) during operations in connection with switching node 11(6),
  (a) the existence of computers 12(6), 12(7) and 12(8) and the ports of switching node 11(6) through which they are connected,
  (b) the respective ports of switching node 11(6) and switching node 11(3) through which those switching nodes are connected to each other, and
  (c) the existence of switching node 11(5) and the respective ports of switching node 11(6) and switching node 11(5) through which those switching nodes are connected to each other;

(ii) during operations in connection with switching node 11(3),
  (a) the respective ports of switching node 11(3) and 11(5) through which those switching nodes are connected to each other,
  (b) the respective ports of switching node 11(3) and 11(2) through which those switching nodes are connected to each other and
  (b) the existence of switching node 11(4) and the respective ports of switching node 11(3) and switching node 11(4) through which those switching nodes are connected to each other; and (iii) during operations in connection with switching node 11(2),
  (a) the existence of computer 12(2), and the port of switching node 11(2) through which they are connected to each other, and
  (b) the respective ports of switching node 11(2) and 11(4) through which those switching nodes are connected to each other.

During a fourth iteration, the computer 12(1) will discover the ports through which switching nodes 11(4) and 11(5) are connected to each other, and the ports through which those switching nodes are connected to computers 12(3) and 12(4) (in the case of switching node 11(4)) and 12(5) (in the case of switching node 11(5). Thus, at the end of the fourth iteration, the computer 12(1) will have discovered the entire topology of the network 10 and loaded it into its network topology database 33.

In addition, during the network topology discovery and switching node configuration phase, the computers 12(m) configure the switching nodes 11(n). In that operation, after a computer 12(m) receives a response message from a switching node 11(n), it will attempt to configure the switching node 11(n). In configuring the switching node 11(n), the computer 12(m) will load information into selected control registers for the switching node, thereby to set selected operating parameters for the switching node.11(n). The operating parameters for the switching nodes 11(n) generally correspond to operating parameters which are used in connection with switching nodes in other networks, and will be apparent to those skilled in the art. To avoid conflicts which may occur if several computers attempt to configure a particular switching node, it is preferable that only one computer 12(m) configure a switching node. Generally, any of the computers 12(m) in the network 10 can configure a switching node 11(n), but it is preferable that, after one computer 12(m) configures the switching node 11(n), that another computer 12(m') (m'≠m) not be permitted to thereafter configure the same switching node 11(n), at least until the switching node 11(n) is later powered down or re-initialized.

To ensure that only one computer 12(m) configure a switching node 11(n), and in further accordance with the invention, at the beginning of a configuration operation after the computer 12(m) receives a response message generated by a switching node 11(n) in response to an identification request message from the computer 12(m), the computer 12(m) will initially attempt to lock the switching node 11(n). When the switching nodes are powered-up and initialized, they are all provided with a predetermined initialization lock value, which, in one embodiment, is zero. In attempting to lock the switching node, 11(n), the computer 12(m) will initially transmit a lock value inquiry message to the switching node 11(n), which, in turn, will generate a lock value response message which contains the switching node's current lock value, for transmission to the computer 12(m). If the switching nodes's current lock value contained in the lock value response message is other than the initialization lock value, the computer 12(m) initially determines that another computer 12(m') (m'≠m) is configuring or has configured the switching node 11(n), and so it will not continue further with the configuration operation, but instead can continue with the network topology discovery operations as described above.

However, if the computer 12(m) determines that the switching node's current lock value as indicated in the lock value response message corresponds to the initialization lock value, the computer 12(m) can preliminarily determine that the switching node 11(n) has not been configured. In that case, the computer 12(m) will generate a lock value change message for transmission to the switching node 11(n), including the initialization lock value and a new lock value. The new lock value generated by the computers 12(m) will preferably be unique to the computer or a value that is highly unlikely to be generated by another computer 12(m') (m'≠m), and maybe, for example, an identifier for the computer, a random number or the like. When the switching node 11(n) receives the lock value change message, if switching node's current lock value corresponds to the initialization lock value as contained in the lock value change message, it (that is, the switching node 11(n)) will update its current lock value to the new lock value as contained in the lock value change message. On the other hand, if the switching node's current lock value does not correspond to the initialization lock value as contained in the lock value change message, it (that is, the switching node 11(n)) will not update its current lock value to the new lock value as contained in the lock value change message.

After the computer 12(m) transmits the lock value change message to the switching node 11(n), it (that is, the computer 12(m)) will again generate a lock value inquiry message for transmission to the switching node 11(n), to initiate a retrieval of the switching nodes's current lock value. The switching node 11(n) will again generate a lock value response message which contains the switching node's current lock value, for transmission to the computer 12(m). If the switching nodes's current lock value contained in the lock value response message corresponds to the new lock value as previously provided by the computer 12(m), the computer 12(m) can determine that it has locked the switching node 11(n), and can configure the switching node 11(n). After configuring the switching node 11(n), the computer 12(m) can continue with the network topology discovery operations as described above.

On the other hand, if the computer 12(m), after receiving the lock value response message from the switching node 11(n), determines that the lock value response message contains a current lock value for the switching node 11(n) which differs from the new lock value as previously provided by the computer 12(m), it (that is, the computer 12(m)) will determine that another computer 12(m') (m'≠m) has locked the switching node 11(n) after the initial lock value response message which it received from the switching node 11(n). In that case, the computer 12(m) will determine that another computer 12(m') (m'≠m) is configuring or has configured the switching node 11(n), and so it will not continue further with the configuration operation, but instead will continue with the network topology discovery operations as described above.

Each computer can perform corresponding operations for each switching node 11(n). It will be appreciated that, at the end of the network topology discovery and switching node configuration phase, all of the computers will have contacted all of the switching nodes during the network topology discovery operations. However, the switching node locking protocol as described above will ensure that each switching node 11(n) will be configured by at most one of the computers 12(m).

After the network topology discovery and switching node configuration phase, the computers 12(m), in a second, normal operational phase, use the network to transfer information, in the process controlling the establishment of virtual circuits through the network. Initially, the computers 12(m) will establish a set of signalling virtual circuits, with each computer 12(m) establishing a signalling virtual circuit with each of the other computers 12(m') (m'≠m). The signalling virtual circuits will be used by the computers 12(m) to transmit messages to facilitate the establishment of other virtual circuits at the request of application programs processed thereby. The other virtual circuits will be used for messages containing information for the respective application programs. After a computer 12(m) establishes a signalling virtual circuit with another computer 12(m'), the other computer 12(m') sends a message to the computer 12(m) which includes an identifier for the other computer 12(m') which is globally unique, and which the computer 12(m) and application programs executed thereby can use to refer to the other computer 12(m'). In one embodiment, the globally unique identifier is an Ethernet MAC address. After a computer 12(m) receives a globally unique identifier from the respective other computer 12(m'), it (that is, computer 12(m)) can load the globally unique identifier in the network topology database 33 along with the network topology information identifying a path through the switching nodes 11(n) to the respective other computer.

In establishing any of the virtual circuits, the computers 12(m) determine from the network topology database 33 a path through the network therebetween, the path identifying the sequence of switching nodes 11(n) and communication links 13(p) between the computers 12(m). The computers 12(m) can determine the appropriate or optimal paths for the respective virtual circuits using any convenient path determination methodology, several of which are well-known by those skilled in the art. After the path has been determined for the respective virtual circuit, the computers will cooperate to provide the virtual circuit path information to the switching nodes 11(n). The switching nodes 11(n) will use the virtual circuit path information provided by the computers 12(m) in transferring cells comprising the respective messages. In those operations, each of the switching nodes 11(n) includes routing tables which identify, for each port through which the switching node receives cells associated with a virtual circuit, the particular port through which the switching node 11(n) is to transmit the cells associated with the virtual circuit. The computers 12(m) load virtual circuit control information into the routing table, which is thereafter used by the switching node 1(n) in forwarding messages for each virtual circuit. Since the computers 12(m) determine the paths for the virtual circuits and load the virtual circuit information into the routing tables for the switching nodes 11(n) along the respective paths for the virtual circuits, the switching nodes 11(n) do not need to have the processing power to accomplish that, which, in turn, can reduce the cost of the switching nodes 11(n).

Figure 2:
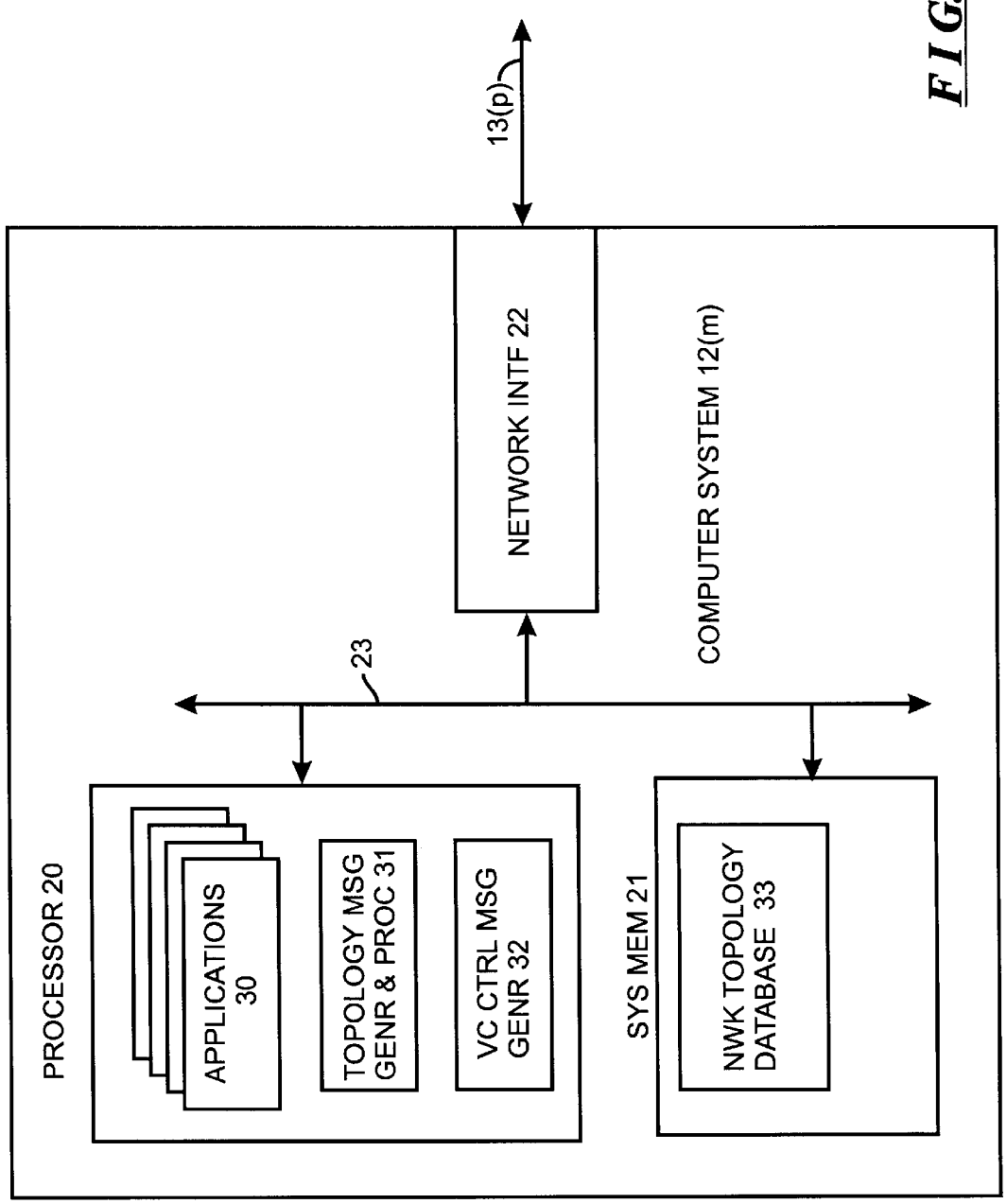
FIG. 2 is a functional block diagram of a computer used in the network depicted in FIG. 1.
Figure 3:
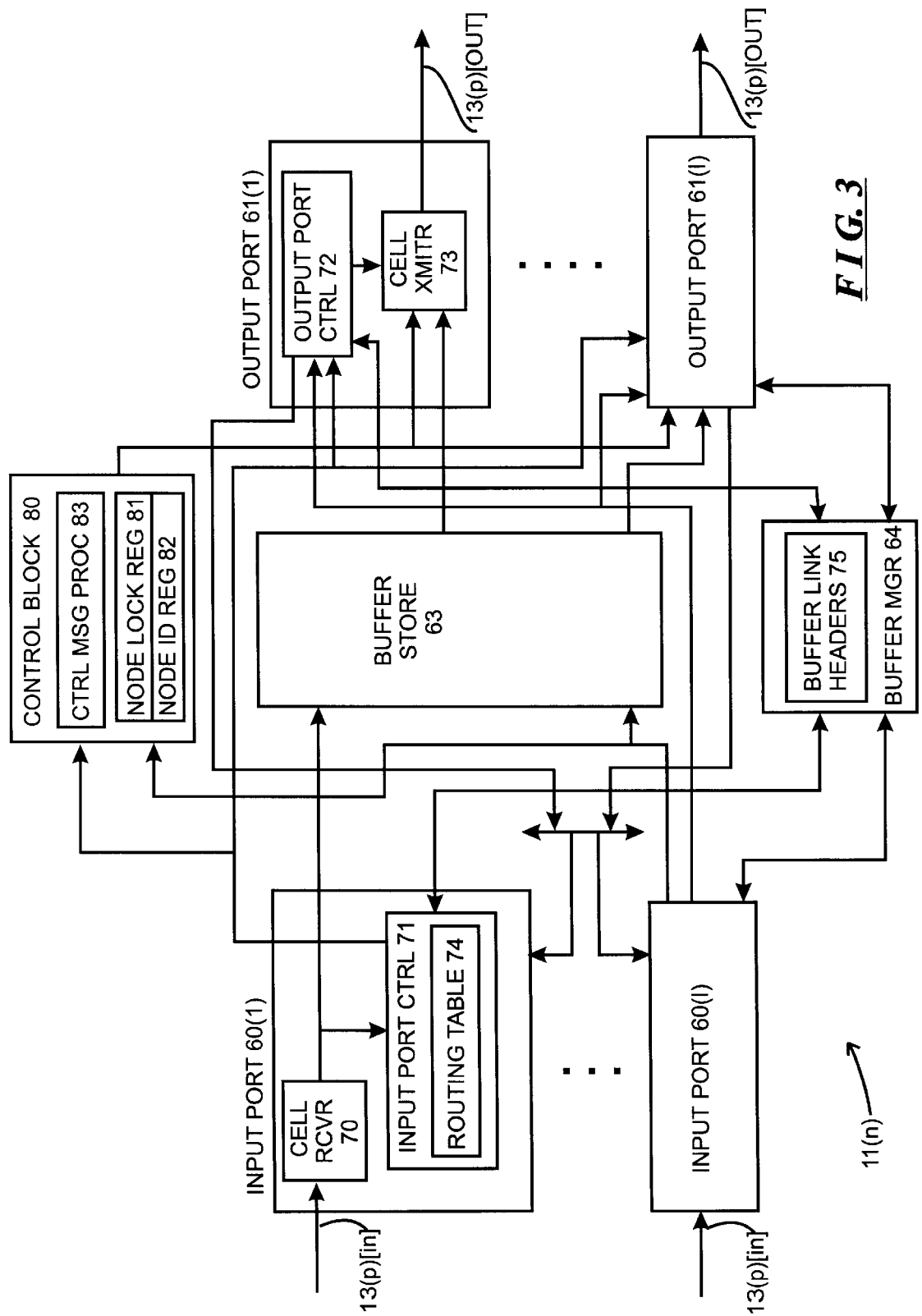
FIG. 3 is a functional block diagram of a switching node used in the computer depicted in FIG. 1.

Operations performed by the computers 12(m) and switching nodes 11(n) in connection with each of these phases will be described below in detail. Preliminarily, however, it would be helpful to describe details of the computers 12(m) and switching nodes 11(n) used in the network 10. FIGS. 2 and 3 depict functional block diagrams of a computer 12(m) and switching node 11(n), respectively, used in one embodiment of the invention. In one embodiment, the computers 12(m) and switching nodes 11(n) are similar to the computers and switching nodes described above in connection with the aforementioned Gutierrez, et al., Clayton, et al., and Williams patent applications. With reference to FIG. 2, computer 12(m) includes a processor 20, system memory 21, and a network interface 22 all interconnected by an interconnection arrangement 23. In one embodiment, the interconnection arrangement 23 includes a conventional PCI bus. The computer 12(m) may also include conventional mass storage subsystem(s) (not shown) connected to the interconnection arrangement 23, which generally provide long-term storage for information which may be processed by the processor 20. The mass storage subsystem(s) may include such devices as disk or tape subsystems, optical disk storage devices and CD-ROM devices in which information may be stored and/or from which information may be retrieved. The mass storage subsystem(s) may utilize removable storage media which may be removed and installed by an operator, which may allow the operator to load programs and data into the computer 12(m) and obtain processed data therefrom.

The computer 12(m) may also include conventional input/output subsystem(s) (not shown) connected to the interconnection arrangement 23, including operator input and output subsystems that generally provide an operator interface to the computer 12(m). In particular, operator input subsystem(s) may include, for example, keyboard and mouse devices, which an operator may use to interactively input information to the computer 12(m) for processing. In addition, the operator input subsystems may provide mechanisms whereby the operator may control the computer 12(m). The operator output subsystems may include devices such as video display devices, through which the computer 12(m) under control of the processor 20, displays results of processing to the operator. In addition, a printer may be provided to provide a hard copy output for the operator.

The network interface 22 retrieves data from the system memory 21 that is to be transferred to other computers operating as destination computers 12(m), generates cells therefrom and transfers the generated cells over the communication link 13(p), which forms one of the communication links 13(p) described above in connection with FIG. 1, connected thereto. In addition, the network interface 22 receives cells from the communication link 13(p), which forms one of the communication links 13(p) described above in connection with FIG. 1, extracts the data therefrom and transfers the data to appropriate buffers in the system memory 21 for storage. A detailed description of a network interface 22 used in one embodiment of the invention is described in the aforementioned Gutierrez, et al., Clayton, et al., and Williams patent applications.

The processor 20 processes one or more application programs, generally identified by reference numeral 30, under control of an operating system. In processing respective ones of the application programs 30, the processor can enable the network interface 22 to transmit messages, in the form of one or more ATM cells, over respective virtual circuits, and to receive messages, also in the form of one or more ATM cells, over respective virtual circuits. In one embodiment, the processor 20 and network interface 22 operate in accordance with the Virtual Interface Architecture ("VIA") specification, Version 1(Dec. 16,1997), published by Compaq Computer Corp., Intel Corp. and Microsoft Corp., in facilitating the transmission and reception of messages over the respective virtual circuits.

As noted above, in accordance with the invention, the computer 12(m) determines the topology of the network 10 and uses the topology to facilitate the establishment of virtual circuits thereover. To accommodate that, the processor 20 also provides two additional elements, identified herein as a topology message generator and processor 31 and a virtual circuit control message generator 32, and the system memory 21 also includes a network topology database 33. The topology message generator and processor 31 is used during the first phase, as described above, to enable the computer 12(m) to acquire network topology information and store it (that is, the topology information) in the network topology database 33. The virtual circuit control message generator 32 is used during the second phase, as described above, to use the network topology information in the database 33 to establish respective virtual circuits through the switching nodes 11(n).

FIG. 3 depicts a functional block diagram of a switching node 11(n) useful in the network depicted in FIG. 1. A detailed description of the structure and operation of one embodiment of switching node 11(n) is contained in the aforementioned Gutierrez, et al., and Clayton, et al. patent applications. Generally, and with reference to FIG. 3, the switching node 11(n) comprises a plurality of input port modules 60(1) through 60(I) (generally identified by reference numeral 60(i)), a plurality of output port modules 61(1) through 61(I) (generally identified by reference numeral 61(i)) a buffer store 63, a buffer manager 64, and a control block 80 including a node lock register 81, a node identifier register 82 and a control message processor 83. The node lock register 81 receives a node lock value that can be used to synchronize access to the switching node during, in particular, the node topology discovery and switching node configuration phase. The node identifier register 82 receives a switching node identifier value that uniquely identifies the switching node 11(n) in the network 10.

Each input port module 60(i) and the correspondingly-indexed output port module 61(i) together comprise a "port" of the switching node 11(n). Each input port module 60(i) is connected to receive cells from a computer 12(m) or a switching node over a communications link 13(p). Each output port module 61(i) is connected to transmit cells to a computer 12(m) or a switching node over the same communication link 13(p). If input port module 60(i) receives cells from, and output port module 61(i) transmits cells to, a switching node, the switching node from which the input port module 60(i) of switching node 11(n) receives cells, or to which the output port module 61(i) of switching node 11(n) transmits cells, is preferably another switching node 11(n') (n'≠n), but may be the same switching node 11(n) if the communication link 13(p) forms a loopback connection for the switching node 11(n).

Each input port module 60(i), when it receives a cell over the communication link 13(p) connected thereto, buffers the cell in the buffer store 63. Each input port module 60(i) includes a cell receiver 70, which actually receives and buffers cells prior to its being transferred to the buffer store 63 for buffering, and an input port module control 71 that includes a routing table 74 which, in turn, includes the virtual circuit information for the virtual circuits over which the input port 12 module 60(i) receives cells. After the cell receiver 70 has received a cell, the input port module control 71 transfers the cell to the buffer store 63 for buffered storage. Generally, the buffer store 63 comprises a plurality of buffers, each of which can store information from one cell, which are organized in linked lists by buffer link headers 75 in the buffer manager 64. The virtual circuit information block for each virtual circuit in the routing table 74 also identifies the particular output port module 61(i') over which cells associated with the virtual circuit are to be transmitted, and the input port module control 71 will, after establishing the linked list, also notify the output port module 61(i') that a cell has been received for the virtual circuit to be transmitted by that output port module 61(i').

Each output port module 61(i), when it receives notification from the input port module control 71 of an input port module 60(i) that at least one cell is being buffered in buffer store 63 for a virtual circuit over which it (that is, the output port module 61(i')) is to transmit cells, will, initiate operations to retrieve cells associated with the virtual circuit from the buffer store 63 and transmit them over the communication link 13(p) connected thereto. Each output port module 61(i) includes an output port module control 72 and a cell transmitter 73. The output port module control 72 receives the notifications from the input port module control 71 of a respective input port module 60(i). In response, the output port module control 72 will access the virtual circuit information block for the virtual circuit as maintained by the routing table 74 of the input port module control 71 to identify the buffer in the buffer store 63 containing the first cell in the linked list associated with the virtual circuit, enable the cell to be retrieved from the buffer store 63 and transfer the cell to the cell transmitter 73 for processing and transmission.

As will be appreciated, an input port module 60(i) may receive messages other than cells, in particular (i) during network topology discovery operations, identification request messages and identification request response messages, (ii) during switching node configuration operations, lock value inquiry messages, lock value response messages and lock value change messages, and (iii) during virtual circuit establishment operations, virtual circuit establishment control messages.

If an input port module 60(i) receives an identification request message, it will provide the identification request message to the control block 80, in particular to the control message processor 83. The control message processor 83, in turn, determines whether the switching node 11(n) is to generate an identification response message or forward it (that is, the identification request message) through an output port module 61(i) for transmission to another switching node or a computer. If the switching node 11(n) is to transmit the identification request message to another switching node or a computer, the identification request message will include the identification of a port through which the switching node 11(i) is to transmit the identification request message, and the control message processor 83 will forward the identification request message to the output port module 61(i') which forms part of that port. The output port module 61(i') will thereafter transmit the identification request message. Similar operations will occur in connection with forwarding of identification response messages received by,the input port module 60(i).

On the other hand, if the control message processor 83 determines the switching node 11(n) is to generate an identification response message, it will generate the response message, including the information from the identification request message and also the identification of the switching node, which is obtained from the node identifier register 82, and the identification of the port ("i") over which the identification request message was received. After generating the identification request response message, the control message processor 83 will forward the message to the output port module 61(i) which forms part of that port for transmission.

If an input port module 60(i) receives a lock value inquiry message, a lock value response message or a lock value change messages, it will also forward the message to the control message processor 83. If the control message processor 83 determines that the message is a lock value response message, which has been generated by another switching node 11(n'), it (that is, the control message processor 83) will forward the message to the appropriate output port module 61(i') for transmission to the computer 12(m) which generated the lock value inquiry message to which the lock value response message is a response. Similarly, if the control message processor 83 determines another switching node 11(n') is to respond to the respective message, it will forward the message to the appropriate output port module 61(i') for transmission to that switching node 11(n'). On the other hand, if the control message processor 83 determines that the message is a lock value inquiry message or a lock value change message to which the switching node 11(n) is to respond, (i) if the message is a lock value inquiry message, it (that is, the control message processor 83) will generate lock value response message in which it loads the switching node's current lock value from the node lock register 81, and provide the lock value response message to the appropriate output port module 61(i') for transmission;

(ii) if the message is a lock value change message, it (that is, the control message processor 83) will compare the current value in the lock value change message to the value in the node lock register, and (a) if the initialization lock value in the lock value change message corresponds to the current lock value in the node lock register 81, it (that is, the control message processor 83) will load the change lock value from the lock value change message in the node lock value, but (b) if the initialization lock value in the lock value change message does not correspond to the current lock value in the node lock register 81, it (that is, the control message processor 83) will not load the lock value from the lock value change message in the node lock value, and instead will ignore the lock value change message.

Finally, if the input port module 60(i) receives a virtual circuit establishment control message, it (that is, the input port module 60(i)) will initially determine whether the message contains virtual circuit establishment control information for the switching node 11(n). If so, the input port module 60(i) will load the virtual circuit information into its routing table 74. On the other hand, if the input port module 60(i) determines that the message contains virtual circuit establishment control information for another switching node 11(n'), it will forward the message to the control message processor 83. The control message processor 83, in turn, will determine from the message the particular output port module 61(i') through which the message is to be transmitted, and forward the message to that output port module 61(i') for transmission.

Figure 4:
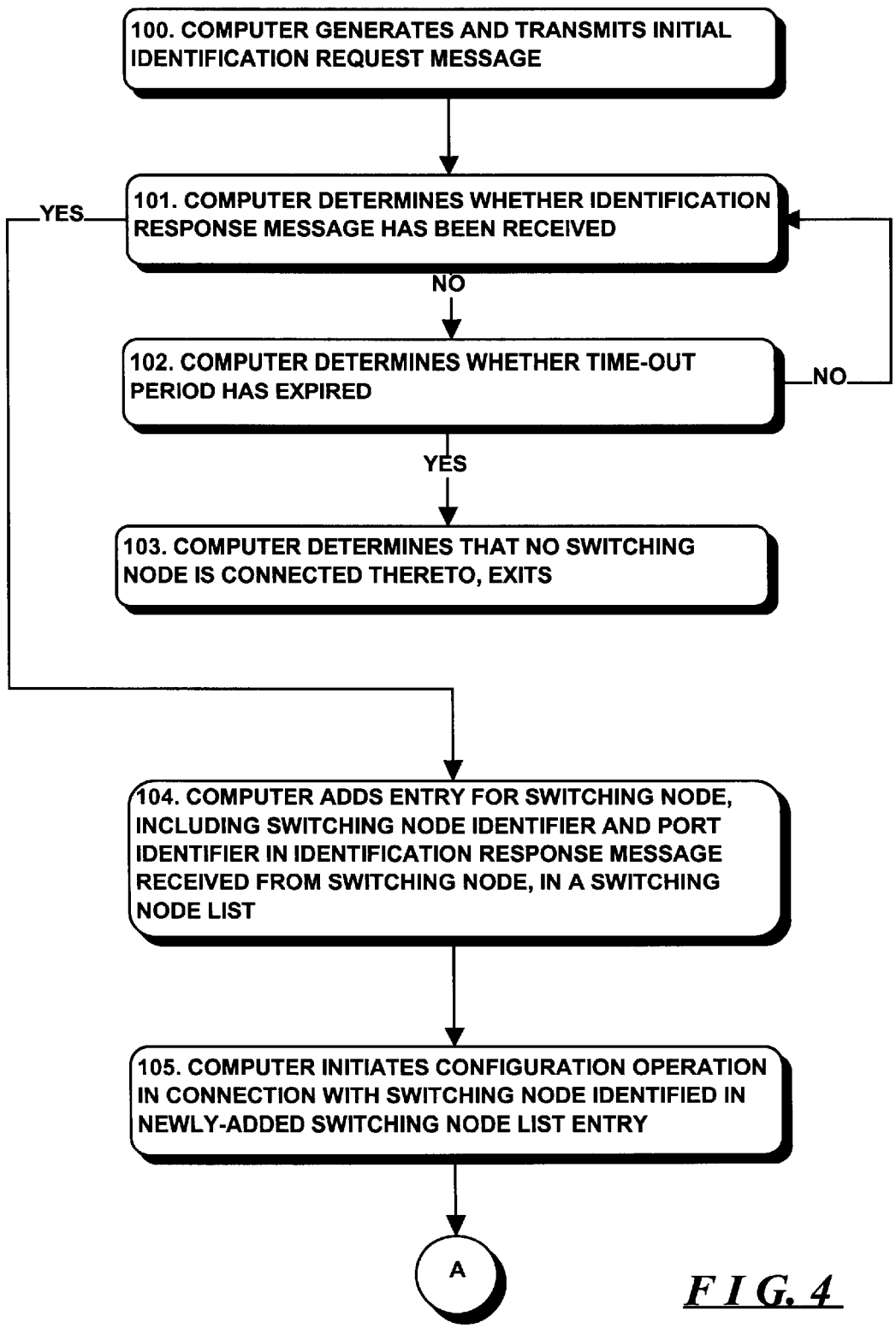
FIG. 4 is a flowchart depicting operations performed by the computer depicted in FIG. 2 in connection with the invention.
Figure 4A:
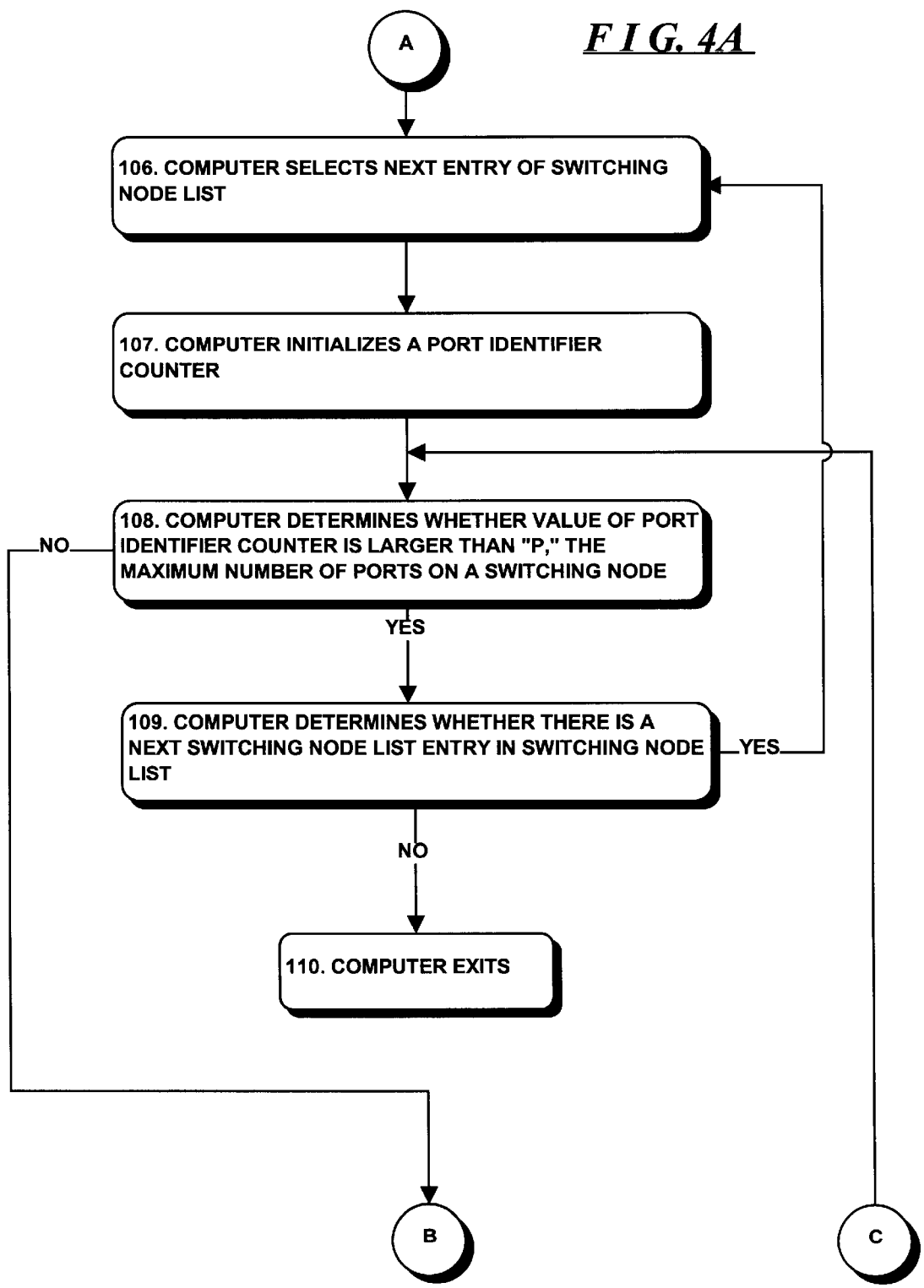
Figure 4D:
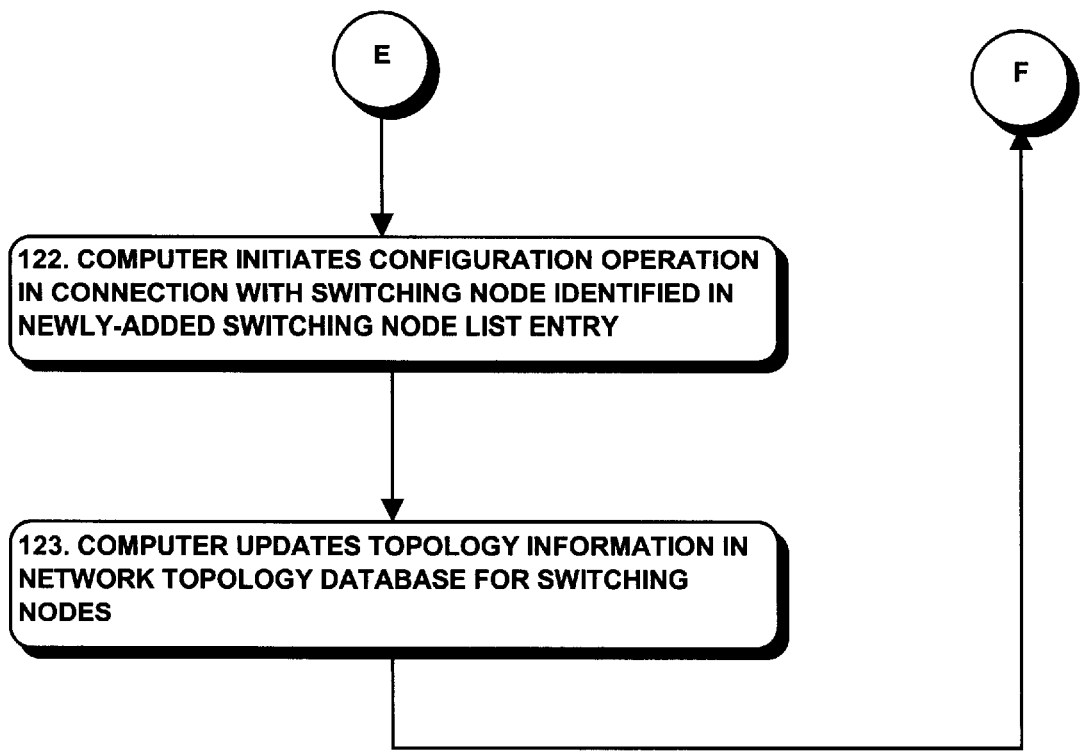
Figure 4E:
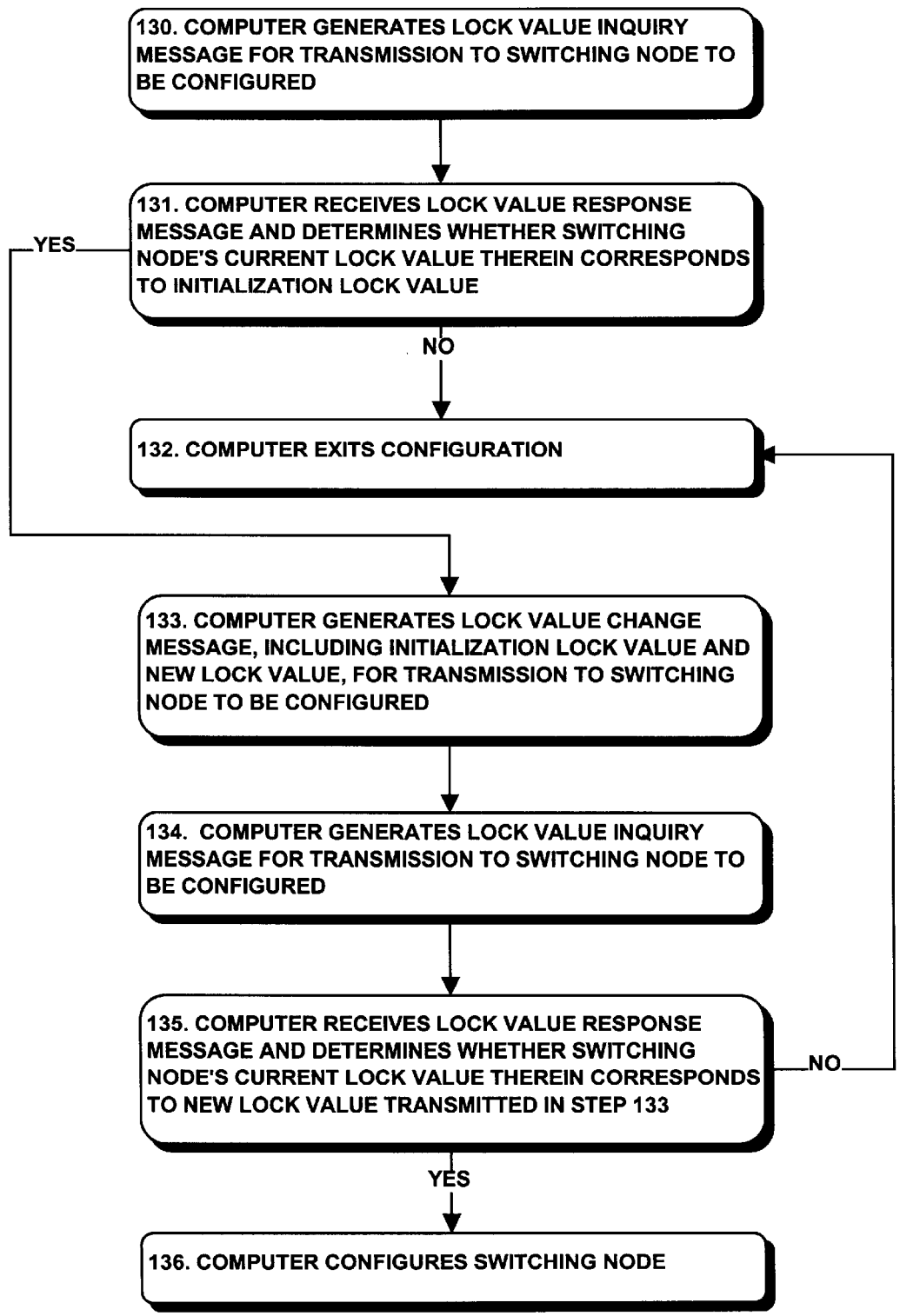

The flowchart in FIG. 4 depicts operations performed by a computer 12(m) in connection with the network topology discovery and switching node configuration phase. Operations depicted in FIG. 4 will be apparent to those skilled in the art from the above description, and will not be further described herein.

The invention provides a number of advantages. In particular, the invention provides a mechanism whereby the computers in a network, and other "intelligent" devices which may be connected to a network, can themselves determine the topology of the switching nodes included in the network, thereby relieving the switching nodes of the necessity of doing so. In addition, the invention provides a mechanism whereby the intelligent devices can configure the switching nodes, so that the switching nodes do not themselves need to do such configuration, and for ensuring that the multiple devices will perform such configuration on a particular switching node, which can lead to conflicts among configuration attempts. Furthermore, the invention provides an arrangement whereby the intelligent devices can directly load virtual circuit information into the routing tables of the respective switching nodes thereby to establish virtual circuits over which they information can be transferred. All of these serve to reduce the amount of processing which the switching nodes would otherwise be required to perform, which, in turn, can serve to reduce the cost of the switching nodes used in a network. In addition, by performing switching node configuration in a distributed manner as described above, a configuration "master" does not need to be provided to perform the switching node configuration.

Furthermore, by using a globally-unique identifier for the respective computers $12(m)$, which, as noted above, in one embodiment corresponds to the Ethernet MAC address, the network 10 avoids problems that can develop in configuring the network if, for example, two computers are erroneously assigned the same identifier by a system administrator.

It will be appreciated that a number of modifications may be made to the system as described above. For example, although the invention-has been described as comprising computers $12(m)$ interconnected by switching nodes $11(n)$, the switching nodes may interconnect numerous types of devices for transferring information thereamong.

In addition, it will be appreciated that other forms of identification request messages and identification response messages may be used during the network topology discovery operations. For example, instead of explicitly providing the sequence of switching nodes identifiers, along with port identifiers, in the identification request and response messages, it will be appreciated that the identification request messages need not be provided with switching node identifiers, and the identification response messages need only be provided with the switching node identifier for the switching node which generates the respective identification response message. In such an arrangement, an identification request message generated by a computer $12(m)$ will include both forward route information, which is used in transferring the identification request message through the network to the switching node $11(n)$ that is to generate the identification response message, and return route information which is used in transferring the identification response message through the network from the switching node $11(n)$ that generates the identification response message to the computer $12(m)$ that generated the identification request message. More specifically, the forward route information contains a series of zero or more port identifiers identifying the respective port (if any) through which the successive switching nodes $11(n)$ are to transmit the identification request message. As each switching node receives the identifying request message, it will examine the forward route information and if it determines that the forward route information contains a port identifier, it will delete the first route identifier in the forward route information and the transmit the identification request message through the port identified by the deleted route identifier. On the other hand if the switching node determines that the forward route identification does not contain a port identifier, it will not forward the identification request message, but instead will generate an identification response message in response to the identification request message.

As noted above, the forward route information in an identification request message generated by a computer $12(m)$ may have zero port identifiers. In that case, it will be appreciated that the identification response message will be generated by the switching node $11(n)$ connected to that computer $12(m)$.

Similarly, the return route information as provided in the identification request message contains a series of zero or more port identifiers identifying the respective port (if any through) which the successive switching nodes $11(n)$ are to transmit the identification response message along the path from the switching node that generates the identification response message to the computer $12(m)$ that generated the identification request message. When a switching node generates an identification response message, it will use the return route information from the identification request message, and append its switching node identifier value and the port identifier for the port through which it received the identification request message. After generating the identification response message, the switching node will transmit it through the port through which received the identification request message. As with an identification request message, each switching node that receives the identification response message will delete the first route identifier in the return route information and the transmit the identification response message through the port identified by the deleted route identifier. Preferably, the return route information will enable the switching nodes to return the identification response message over a path comprising the same series of switching nodes as was used in transferring the identification request message, although in the opposite direction to enable the identification response message to be transferred from the switching node which generated it to the computer $12(m)$ which generated the identification request message. In that case, upon receiving the identification response message, the computer $12(m)$ can associate the switching node and port identified in the identification response message with the path identified in the identification request message for which the identification response message was a response, and thereby determine and extend a portion of the network topology associated with that path.

Furthermore, although the computers $11(m)$ have been described as generating identification request messages for each of the ports for all of the ports of the respective switching nodes except for the port over which the respective identification response messages were received, it will be appreciated that, if the switching nodes know their respective ports which are connected to computers, switching nodes, and the like, and if that information is provided to the computers, the computers need only generate identification request messages for those ports.

In addition, although the computers $12(m)$ have been described as performing configuration during the network topology discovery and configuration phase, it will be appreciated that configuration need not be performed contemporaneously with the network topology discovery operations, and, indeed, may be performed separately or by a configuration master, which may be one of the computers $12(m)$ (or other devices) or by a configuration master device provided particularly therefor. Furthermore, although the computers have been described as performing the network topology discovery and configuration operations as an initial phase, it will be appreciated that the computers may also perform at least network topology discovery operations at other times to determine changes, if any, in the network topology. Computers may be enabled to perform network topology discovery operations, for example, periodically, or upon selected triggering events such as receipt of a message from a computer which is not identified in its network topology database 33 or the like.

Furthermore, although the invention has been described in connection with a network in which information is transferred over virtual circuits, it will be appreciated that the network may, instead, transfer information in a "connectionless" manner. In that case, instead of providing virtual circuit information for the routing tables 74 during the second phase, the computers 12(*m*) may instead provide absolute destination address/output port information which the switching nodes would use in routing message packets which they receive.

In addition, although the invention has been described in connection with a network in which the computers 12(*m*) are assigned globally unique identifiers in the form of Ethernet MAC addresses, it will be appreciated that other globally unique identifiers may be used instead or in addition.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment oft his invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A network comprising: a plurality of network entities, including message generating devices and switching nodes, the switching nodes interconnecting the message generating devices to enable the message generating devices to transfer information thereamong,
   A. each entity being configured to, in response to receipt of an identification request message directed thereto, generate an identification response message identifying the entity and providing reception path information identifying a path over which the entity received the identification request message and transmit the identification response message over the path; and
   B. at least one device including a network topology database configured to store network topology information representative of the interconnection topology in the network and a network topology determination processor configured to determine network interconnection topology information for use in the network topology database, the network topology determination processor being configured to operate in a series of iterations, in each iteration enabling the device to transmit an identification request message over a path in the network to determine whether an entity is present in the network at the end of the path defined in the identification request message, the path extending over one or more entities, and, upon receipt of an identification response message responding to the identification request message, obtain the entity identification and path information therefrom for use in the network topology database.

2. A network as defined in claim 1 in which at least one device further includes a switching node configuration processor configured to, after receiving an identification response message from an entity, selectively initiate a configuration operation in connection with the entity to provide at least one operational parameter to the entity.

3. A network as defined in claim 2 in which switching node configuration processor initiates a configuration operation in connection with the entity if the entity is a switching node.

4. A network as defined in claim 3 in which the switching node configuration processor is configured to initially perform a locking operation to attempt to lock the switching node.

5. A method of facilitating discovery by a device connected to a network of network topology information, the network including a plurality of network entities, including message generating devices and switching nodes, the switching nodes interconnecting the message generating devices to enable the message generating devices to transfer information thereamong, the device being connected to one of said network entities, the method comprising the steps of, in at least one iteration:
   A. enabling the device to transmit an identification request message over a path in the network to determine whether an entity is present in the network at the end of the path defined in the identification request message, the path extending over one or more entities;
   B. in response to receipt by a first entity of an identification request message directed thereto, enabling the first entity to generate an identification response message identifying the first entity and provide reception path information identifying a path over which the first entity received the identification request message, and transmit the identification response message over the path to the device;
   C. enabling the device, after receiving an identification response message, to obtain the first entity identification and path information therefrom for use in a network topology database; and
   D. operating in a series of iterations, in each iteration enabling the device to transmit an identification request message along a path including the first entity to determine whether another entity is coupled to the first entity and, upon receipt of an identification response message responding to the identification request message, obtain entity identification and path information from the identification response message for use in the network topology database.

6. A method as defined in claim 5 in which the device is further enabled to, after receiving an identification response message from an entity, selectively initiate a configuration operation in connection with the entity to provide at least one operational parameter to the entity.

7. A method of facilitating discovery by a device connected to a network of network topology information, the network including a plurality of network entities, including message generating devices and switching nodes, the switching nodes interconnecting the message generating devices to enable the message generating devices to transfer information thereamong, the device being connected to one of said network entities, the method comprising the steps of, in at least one iteration:

A. enabling the device to transmit an identification request message over a path in the network to determine whether an entity is present in the network at the end of the path defined in the identification request message, the path extending over one or more entities;

B. in response to receipt by an entity of an identification request message directed thereto, enabling the entity to generate an identification response message identifying the entity and provide reception path information identifying a path over which the entity received the identification request message, and transmit the identification response message over the path;

C. enabling the device, after receiving an identification response message, to obtain the entity identification and path information therefrom for use in a network topology database;

D. after receiving an identification response message from an entity, enabling the device to selectively initiate a configuration operation in connection with the entity to provide at least one operational parameter to the entity; and E. enabling the device to initiate a configuration operation in connection with the entity if the entity is a switching node.

8. A method as defined in claim 7 in which the device is enabled to initially perform a locking operation to attempt to lock the switching node.

\* \* \* \* \*

UNITED STATES PATENT AND TRADEMARK OFFICE
CERTIFICATE OF CORRECTION

PATENT NO. : 6,791,948 B1
DATED : September 14, 2004
INVENTOR(S) : Peter J. Desnoyers et al.

It is certified that error appears in the above-identified patent and that said Letters Patent is hereby corrected as shown below:

Title page,
Item [22], PCT, should read:
-- [22] Filed: July 3, 1999 --

Signed and Sealed this

Twenty-fifth Day of January, 2005

JON W. DUDAS
*Director of the United States Patent and Trademark Office*

UNITED STATES PATENT AND TRADEMARK OFFICE
CERTIFICATE OF CORRECTION

PATENT NO. : 6,791,948 B1
DATED : September 14, 2004
INVENTOR(S) : Peter J. Desnoyers et al.

It is certified that error appears in the above-identified patent and that said Letters Patent is hereby corrected as shown below:

<u>Title page,</u>
Insert Item -- [22] Filed: July 3, 1999 --.

Signed and Sealed this

Thirteenth Day of September, 2005

JON W. DUDAS
*Director of the United States Patent and Trademark Office*